Aug. 25, 1953
G. E. ANDERSON
2,650,062
TIRE SPREADER
Filed Oct. 4, 1951
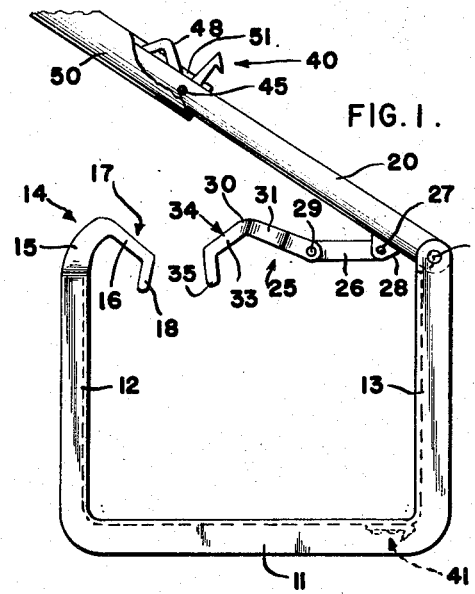
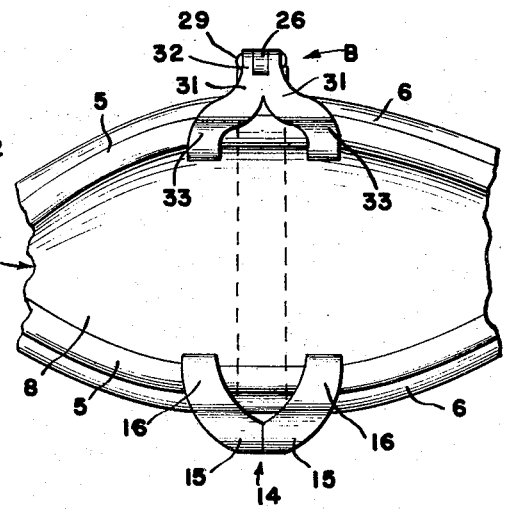
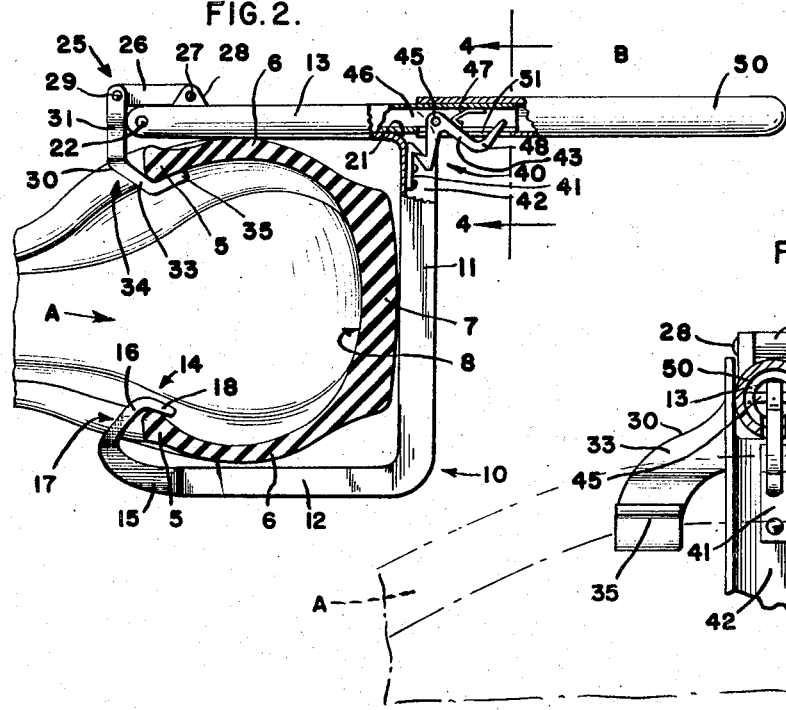
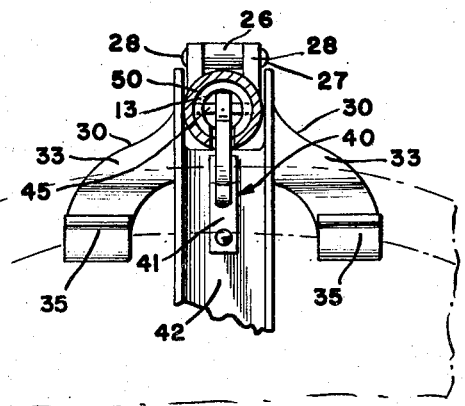
Inventor
GUY E. ANDERSON
By Lancaster, Allwine & Rommel
Attorneys Patented Aug. 25, 1953

2,650,062

UNITED STATES PATENT OFFICE 2,650,062

TIRE SPREADER

Guy E. Anderson, Wytopitlock, Maine

Application October 4, 1951, Serial No. 249,697

3 Claims. (Cl. 254—50.1)

This invention relates to tire casing spreaders.

An important object of the invention is to provide a spreader which will permit ready removal and replacement of inner tubes without damage to the tubes.

Another important object is to provide such a spreader in which, when the casing is spread and held in such spread condition by the spreaders, there are no projections of the spreader in the way, which projections would be apt to be accidently struck or moved by the operator, causing accidental collapse of the spreader.

Still another important object is to provide, on a fixed hook and a movable hook assembly, a plurality of bevelled surfaces to facilitate insertion of a tube in the cavity of the casing.

Furthermore, an important object is to provide a means to latch the parts of the new spreader in a spread position which latch means is so positioned that accidental manipulation thereof is substantially impossible.

A further important object is to provide a sturdy casing spreader which includes a handle and a latch for the handle, the latch being unlatched by the same hand of the operator which operates the handle and immediately preceeding the operation of the handle.

Other objects and advantages of the invention will be apparent during the course of the following detailed description of the invention, taken in connection with the accompanying drawing, forming a part of this disclosure and in which drawing:

Fig. 1 is an elevation of the new casing spreader.

Fig. 2 is a view mostly in elevation but with some parts broken away to better illustrate the new spreader, and with the latter applied to a casing, shown in transverse section.

Fig. 3 is a top plan of the new spreader in use.

Fig. 4 is an enlarged section, substantially on the line 4—4 of Fig. 2.

In the drawing, wherein for the purpose of illustration is shown a preferred embodiment of the invention and wherein similar reference characters designate corresponding parts throughout the several views, the letter A designates a tire casing and the letter B the new casing spreader.

The casing A is of conventional shape with edge beads 5 from which extend the resilient side walls 6 to the tread 7, all defining an open-mouthed tube-receiving cavity 8, but the mouth must be spread, by drawing one bead 5 and its associated side wall 6 away from the other bead 5 and its associated side wall 6 when a tube is to be properly removed from or inserted into the cavity 8.

The new casing spreader B includes a frame or body 10 having a rigid tread-engaging portion 11, which is preferably straight, and two preferably straight rigid arm portions 12 and 13 extending in substantial parallelism from the ends of the portion 11 and may engage the side walls 6. The free end of the arm portion 12 terminates in a fixed casing bead-holding means which comprises an inwardly-projecting bifurcated fixed hook 14, this being one of a pair of hooks. The hook 14 preferably has a pair of curved portions 15 from the outer ends of which extend a pair of smooth-surfaced intermediate portions 16 with their outer surfaces 17 extending inwardly and toward the portion 13 to provide a pair of spaced-apart bevelled surfaces, which extend away from each other, whereupon the free end or beak portions 18 of the hook extend from the portions 16 outwardly and toward the portion 10.

Pivotally carried by the body 10 is a straight handle 20 which is pivoted at one of its ends to the free end of the arm portion 13 (which is preferably open longitudinally along its outer face to provide a recess 21 to accommodate the handle 20) as by a pivot pin 22.

The handle 20 carries a movable casing bead-holding means or hook assembly 25 comprising a link portion 26 pivotally connected, as by the pivot pin 27 is a pair of tongues or projections 28 integral with the handle 20 adjacent the pivotal connection of the handle 20 and arm portion 13. The other end of the link 26 is pivotally connected, as by the pivot pin 29 to a bifurcated movable hook 30 which includes a pair of short arms 31 extending from an eyed portion 32 which accommodates the pin 29, and the outer end of each arm 31 fixedly carries a smooth-surfaced intermediate portion 33 with its outer surface 34 forming a bevelled surface, when the spreader is employed as in Fig. 2, complementary to the bevelled surface 17. From the outer end of each intermediate portion is a beak portion 35 preferably substantially like the portion 18.

The length of the link 26 is important, when in connection with the positions of the pivot pins 27 and 29. When the spreader B is in use as in Fig. 2, the longitudinal axes of the link 26 and arm 31 form substantially a right angle, as is obvious in Fig. 2.

Means 40 to latch the handle 20 against accidental pivotal movement comprises a beaked keeper 41 preferably within a recess 42 in the portion 11 and secured to the portion 11, and a pivoted dog 43 of somewhat Z-shape having a beak 44 to engage the beak of the keeper 41 and pivoted as at 45 to the handle 20. Intermediate the ends of the dog 43, is a recess 45 being provided to accommodate portions of the dog as is clear in Fig. 2, and a resilient means as a leaf spring 47 being provided to urge the dog into holding association with the keeper 41, but this holding association may be broken by the operator pressing upon the outwardly-extending portion 48 of the dog. It will be noted that the position of the means 40 is such that it would be almost impossible to accidently strike the portion 48 when the means 40 is in use, since it is protected both by the handle 20 and by the portion 11 being in a corner defined by the handle 20 and portion 11 as is clear in Fig. 2. However, the operator, when he hooks his hand about the handle 20 to manipulate the spreader B to release a casing A, his finger readily releases the dog 43.

I prefer to include a removable handle extension 50 which will assist in rendering more easy the operation of spreading the casing A. This handle extension 50 is preferably slotted, as at 51 at its handle-attaching end, to accommodate portions of the dog 43, and is provided with a socket to permit portions of the dog to extend therethrough as in Fig. 2.

In use, the spreader B is positioned with the handle 20 substantially as in Fig. 1 and a portion of the casing B within the compass of the portions 11, 12 and 13, the tread 7 resting upon the portion 11. The operator, who has hooked the hook 14 over the adjacent bead 5 to take the position as in Fig. 2 then pivots the handle 20 toward the left in Fig. 1 with one hand while he guides the movable hook assembly 25 so he may insert the hook 30 around the other bead 5. He then pivots the handle 20 toward the right as in Figure 1 until it substantially parallels the body portion 13 (at which time the arm 31 is directly over the free end of the portion 13 and the link portion 26 parallels and contacts a portion of the handle 20, so that there are no decided projections from the body 10) and is stopped by the inner surface of the portion 13, and positions of the arms 31 and link 26, at which time the dog 43 engages the keeper 41 as in Fig. 2. The tube may now be slipped into or out of the cavity 8 of the casing A, the bevelled surfaces 17 and 34 assisting in this and there being no decided projections outwardly of the body 10 to get in the way of the operator's hands or clothing.

And, because the latch means 40 is at the corner of the handle 20 and body portion 11 it is well protected against being caught in the operator's clothing, yet is readily manipulated by a finger of the hand of the operator manipulating the handle 20.

Since a substantial part of the handle 20 is within the recess 21 it cannot be readily knocked accidently out of place when as in Fig. 2.

Various changes may be made to the form of the invention herein shown and described without departing from the spirit of the invention or scope of the claims.

What is claimed is:

1. A tire casing spreader including a body receiving a portion of a casing, said body having a fixed casing bead-holding means and a rigid portion opposite said means, a handle, means pivoting said handle at one end thereof to said rigid portion at the free end of said rigid portion, to pivot selectively toward and away from said fixed casing bead-holding means carried by said handle comprising a link portion pivoted at one end to said handle closely adjacent the pivotal connection of said handle and rigid portion, and a casing bead holder pivoted at the other end of said link portion, including a short arm, the pivotal connections of said handle and rigid portion, of said handle and link portion and of said link portion and arm being such that said arm will extend directly over the free end of said rigid portion and in contact with the pivoted end of said handle, and said link will parallel and be in contact with a portion of said handle, when said movable casing bead-holding means is farthest from said fixed casing bead-holding means.

2. A tire casing spreader according to claim 1 characterized in that said rigid portion is provided with a recess accommodating a substantial portion of said handle when said movable casing bead-holding means is farthest from said fixed casing bead-holding means.

3. A tire casing spreader including a body receiving a portion of a casing, said body having two spaced-apart parallel rigid portions and a third rigid portion normal thereto and fixedly joining said two rigid portions, said portions being of channel iron construction, providing a plurality of recesses, a first casing bead-holding means carried by one of said two rigid portions, a handle, means pivoting said handle to the other of said two rigid portions, said handle being longer than said other of said two rigid portions, a second casing bead-holding means carried by said handle remote from the free end thereof, disposed adjacent said first casing bead-holding means when said handle is adjacent said first casing bead-holding means and remote therefrom when the free end of said handle is adjacent the juncture of said other of said two rigid portions and said third rigid portion, and latch means for said handle when in the last-mentioned position, said latch means being carried partly within the recess of said third rigid portion and partly by said handle at the portion of said handle inwardly of its free end and closely adjacent said juncture when said handle is in the said last-mentioned position the recess of said other portion accommodating a substantial portion of said handle when in said last-mentioned position.

GUY E. ANDERSON.

References Cited in the file of this patent

UNITED STATES PATENTS

| Number | Name | Date |
|---|---|---|
| 1,469,473 | Battaline | Oct. 2, 1923 |
| 1,922,740 | Matchey | Aug. 15, 1933 |
| 1,964,602 | Schumacher | June 26, 1934 |
| 1,990,611 | Mutchler | Feb. 12, 1935 |
| 2,058,100 | Peaden et al. | Oct. 20, 1936 |
| 2,173,795 | Fisher | Sept. 19, 1939 |